United States Patent [19]
Roberts

[11] Patent Number: 6,020,725
[45] Date of Patent: Feb. 1, 2000

[54] SELF-EXCITED ASYNCHRONOUS ALTERNATING CURRENT GENERATOR WITH PARAMUTUAL INDUCTIVE COUPLING

[75] Inventor: Gary Dean Roberts, Riverton, Utah

[73] Assignee: Lifeline Enterprises L.L.C., Riverton, Utah

[21] Appl. No.: 08/637,415

[22] Filed: Apr. 25, 1996

[51] Int. Cl.[7] .................................................. H02P 9/00
[52] U.S. Cl. ........................... 322/90; 310/184; 318/748; 322/47
[58] Field of Search .................................. 322/31, 35, 90; 310/65 R

[56] References Cited

U.S. PATENT DOCUMENTS

| | | | |
|---|---|---|---|
| 3,675,117 | 7/1972 | Reimers | 322/31 |
| 4,132,932 | 1/1979 | Wanlass | 318/795 |
| 4,228,391 | 10/1980 | Owen | 322/35 |
| 4,242,628 | 12/1980 | Mohan et al. | 322/35 |
| 4,786,853 | 11/1988 | VanMaaren | 322/75 |
| 4,808,868 | 2/1989 | Roberts | 310/68 R |
| 4,959,573 | 9/1990 | Roberts | 310/68 R |
| 5,039,933 | 8/1991 | Dong | 322/47 |

*Primary Examiner*—Steven L. Stephan
*Assistant Examiner*—Nicholas Ponomarenko
*Attorney, Agent, or Firm*—Robert B. Crouch

[57] ABSTRACT

An asynchronous alternating current motor/generator having an armature winding which includes interspersed energy coils and reflux coils which are electrically and inductively isolated from each other, but which are paramutually inductively coupled through the rotor. Each reflux coil is positioned at 90 electrical degrees to the adjacent energy coil and is tuned to minimize the inductive reactance of the motor/generator.

8 Claims, 2 Drawing Sheets

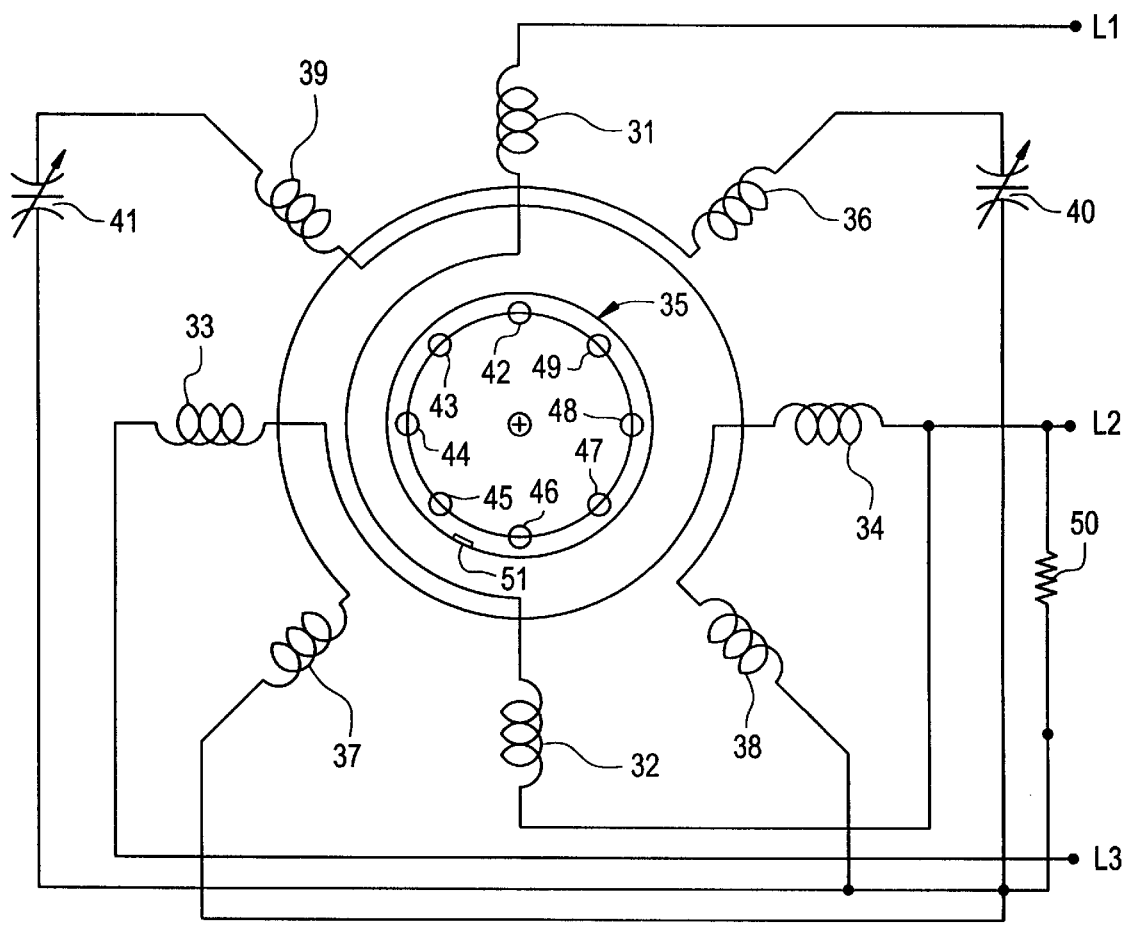

SELF-EXCITED ASYNCHRONOUS ALTERNATING CURRENT GENERATOR WITH PARAMUTUAL INDUCTIVE COUPLING

The present invention relates to an alternating current induction generator/motor and more particularly to an asynchronous single-phase alternator.

BACKGROUND OF THE INVENTION

For simplicity and ease of construction, the typical alternating current generator, or alternator, includes a stationary armature winding composed of a large number of individual conductors assembled in slots formed in the inner surface of a hollow cylindrical iron stator, and a revolving field structure, or rotor, which has a plurality of individual field windings and is mounted for rotation within the stator. When the armature winding is installed, the conductors are connected in pairs to form coils which are so positioned in the stator that the two conductors of each coil overlie field windings of opposite polarity. The coils are in turn connected in a group or groups, one such group for each phase of the alternator. Since relative movement between a magnetic field and a sequence of conductors is necessary for production of electricity, the field windings of an alternator must be energized or excited. Most generators are synchronous machines that are designed to enable them to supply their own magnetic requirements. This is accomplished by applying DC power through brushes and slip rings or, in a brushless synchronous unit, by an inductive coupling to a secondary (DC) generator on the same shaft.

A less expensive alternative is to use a standard induction motor and drive it with another power source, i.e. a combustion engine, to generate electricity. Such units have to rely on a host utility to create the magnetic field. If that power source is cut off, the induction generator will cease production of electricity. Thus, all conventional induction machines are dependent upon an outside power source for their magnetic requirements.

A basic requirement for an induction alternator is that a revolving magnetic field must be produced in the air gap between the rotor and the stator. In a two-phase or any polyphase induction alternator, the fact that the currents flowing in the different phase windings are at 90 electrical degrees to each other produces a sinusoidally distributed magnetic field which revolves in synchronism with the magnetized rotor field. In the most common types of conventional alternators, the magnetic field has typically been energized by current supplied from a source which is external of the alternator itself. This is particularly true in the case of single-phase asynchronous alternators wherein the pulsating stator field produced is non-directional and does not create a revolving field. Without the influence of an out-of-phase or reactive current, the magnetic field created in the gap between the armature winding and the rotating field windings in a single phase asynchronous alternator will alternately expand and collapse. However, since there is no movement of the magnetic field between field windings the current thus generated is non-directional. In the most commonly used single phase asynchronous generators, i.e. split capacitor alternators, a large energy winding is directly connected to the power supply line and an out-of-phase current is supplied by a smaller auxiliary winding and a serially connected capacitor which are connected to the energy winding and across the power line.

Even the split capacitor alternators are efficient only when the magnetic field in the large energy winding is balanced with that of the auxiliary winding and their respective currents are displaced by 90 electrical degrees. Since the 90 degree displacement exists only at design load, a disproportionate distribution of magnetic flux occurs at other load points, with consequent negative sequence currents in the rotor and stator, space harmonics in the air gap, and high leakage reactance. Furthermore, the energy produced by the collapse of the magnetic field is returned to the system as VARS which adversely affects power factor and efficiency. Accordingly, asynchronous single-phase alternators have achieved only limited acceptance in industry due to the fact that they typically operate with efficiencies of 40–60% and power factors of 10–60%. In addition, because the LC circuit is tied directly to the power line, whenever a split capacitor alternator is connected to a non-linear load there is the risk of drawing high current to the resonant winding to the point of failure of the alternator.

SUMMARY OF THE INVENTION

An object of this invention is to make possible, through auto-controlled self-excitation, the independent and efficient operation of a single-phase asynchronous alternator. The present invention overcomes the inadequacies and limitations of the prior known alternators by provision of an asynchronous single-phase alternator which achieves improved energy transfer across the air gap from rotor to stator thus permitting operational efficiencies of 75–90% and power factors of 95–97%. These results are obtained by excitation of the magnetic field with internally-generated alternating current, the frequency of which corresponds to the frequency of rotation of the magnetic field. This is accomplished by providing in the armature winding a reflux coil which is positioned at 90 electrical degrees to the energy coils and which is paramutually inductively coupled to the energy coil through the rotor.

DRAWING

The best mode presently contemplated of carrying out the invention will be understood from the detailed description of the preferred embodiments illustrated in the accompanying drawing in which:

FIG. 1 is a schematic view in elevation of an alternator/motor according to the present invention, which illustrates the armature winding as including an energy coil and a tuned reflux coil, and FIG. 2 is a schematic view in elevation of a two-pole, single-phase alternator according to the present invention, and FIG. 3 is a schematic view in elevation showing the present invention as applied to a two-pole, two-phase alternator/motor.

DETAILED DESCRIPTION

Figure 1:
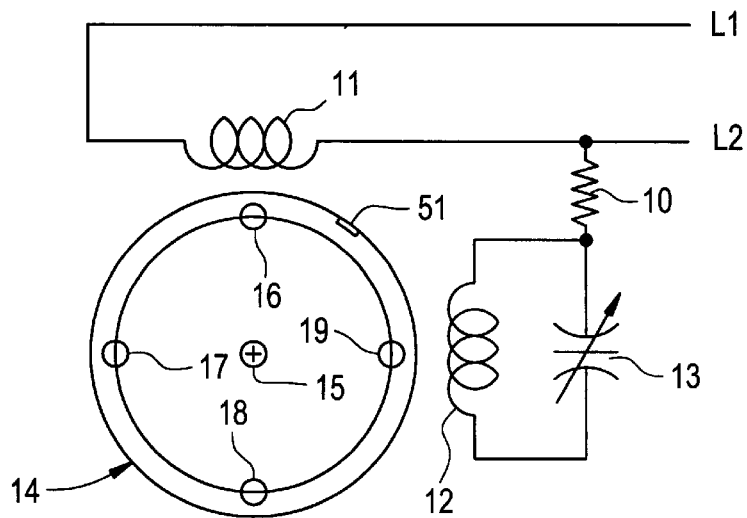

Referring more particularly to FIG. 1, the armature winding for each pole of the present alternator includes an energy coil 11 connected across the AC supply line L1, L2, and a reflux, or excitor, coil 12 positioned at 90 electrical degrees to the energy coil 11. A variable AC capacitance 13 is connected in series with the reflux coil 12 to form a tuned tank circuit which is connected through a resistor, or metal oxide varistor, 10 to neutral or electrical ground L2. A cylindrical rotor 14 is mounted for rotation about its longitudinal axis on a shaft 15. A number of field windings 16–19 are evenly spaced around the circumference of the rotor in proximity to the coils 11 and 12. The resistor 10 is sized to bleed off any electro-static potential which may build up on the reflux coil. The reflux coil is electrically and inductively isolated from the energy coil. Since both coils are inductively connected to the rotor, but not to each other, this inductive coupling through the rotor is referred to as a paramutual or transitional coupling.

Figure 2:
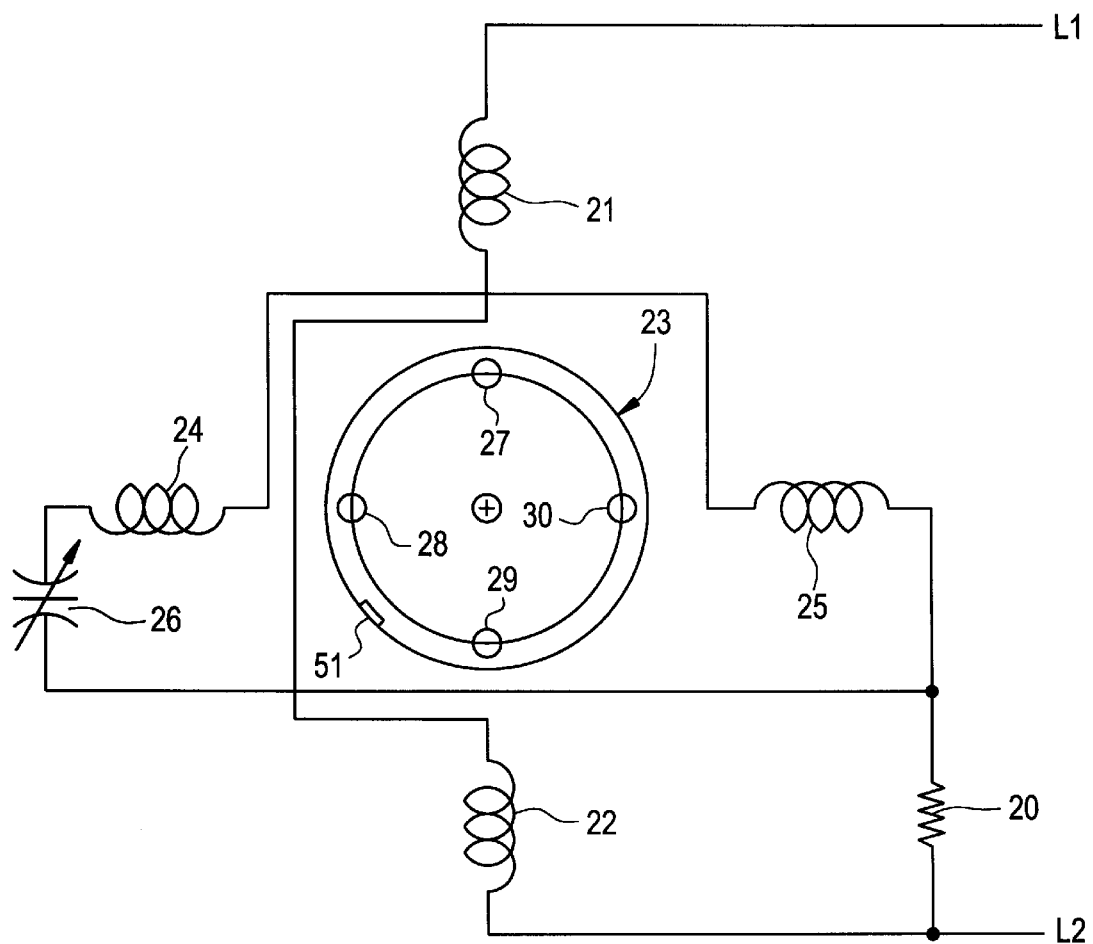

In the two-pole single phase alternator illustrated in FIG. 2, energy coils 21 and 22 are disposed on diametrically opposite sides of a rotor 23. The energy coils are connected in series with each other and across the AC supply line L1, L2. Reflux coils 24 and 25 are disposed on diametrically opposite sides of the rotor 23 at 90 electrical degrees to, and midway between, the energy coils. The reflux coils are connected in series with each other and with a variable AC capacitance 26 to form a tuned tank circuit which is connected through a resistor 20 to neutral or electrical ground L2. The rotor 23 is a cylindrical structure which is mounted for rotation about its longitudinal axis. The AC capacitance is adjusted to bring the capacitive reactance into balance with the inductive reactance of the generator and the designed load. The number of turns in each reflux coil is chosen to minimize the amount of capacitance necessary to produce the required alternating VARS. A series of parallel, elongated conductors 27–30 are spaced about and imbedded in the periphery of the cylindrical structure in close proximity to the energy and reflux coils and are circumferentially short-circuited at both ends by conducting rings to form what is known as a squirrel cage rotor. This is the preferred rotor construction for small and medium size alternators wherein the parallel conductors serve as field poles or windings. However, it is understood that an alternative rotor structure may be employed, particularly for use with large alternators, wherein individual wound coils on the peripheral surface of the cylindrical structure form the field poles.

In the operation of the present two-pole, single phase alternator of FIG. 2, as the rotor structure rotates, the conductors 27–30 are individually and sequentially moved past the energy coils 21 and 22. If the conductors are energized, current is then induced onto line L1 as the lines of magnetic flux emanating from the conductors 27–30 are cut by the energy coils. While much of the energy carried by the individual conductors is dissipated as they pass the energy coils, there is substantial residual energy remaining in each of the conductors as they are carried away from the energy coils and toward the reflux coils 24 and 25. As the residual flux lines from the conductors are cut by the reflux coils, current flows from the reflux coils to the AC capacitance 26 where it is stored as the capacitor is charged. The AC capacitor then discharges before the conductors pass clear of the reflux coils. The alternating current discharged from the capacitor flows back through the reflux coils and across the air gap to energize or excite the conductors. Since the capacitor 26 is continually charged and then discharged, the conductors are continually energized by the reflux coils. Thus, as the rotor structure rotates, the electrical charge on the conductors is alternately inductively transferred to the energy coils and then renewed by the tank circuit which includes the reflux coils.

While the present invention is primarily directed to single phase alternators, it is, in many instances, also applicable to polyphase alternators. Accordingly, a two-phase alternator according to the present invention is illustrated in FIG. 3 in which two pairs of series-connected energy coils 31, 32 and 33, 34 are each connected across the AC supply line L1, L2,L3. The energy coils of each pair are oppositely wound and are arranged on opposite sides of a rotor 35 such that the four coils are evenly spaced about the circumference of the rotor. Two pairs of reflux coils 36, 37 and 38, 39 are each connected in series with a variable AC capacitance 40, 41 to form two tuned tank circuits, each of which is connected through a resistor 50 to neutral or electrical ground L2. A separate tank circuit is required for each phase of the alternator. Similar to the rotor 23 of FIG. 2, the rotor 35 is a cylindrical structure mounted for rotation about its longitudinal axis. A series of parallel, elongated conductors 42–49 are evenly spaced about the periphery of the rotor and circumferentially short circuited at both ends to form a squirrel cage construction. The energy coils 31–34 and the reflux coils 36–39 are positioned in close proximity to the conductors 42–49 and are evenly spaced from each other. The energy coils are evenly spaced, in this case at 90 mechanical degrees, from the adjacent energy coils, while the reflux coils are positioned at 90 electrical degrees from, or midway between, the adjacent energy coils. The two-phase alternator of FIG. 3 operates in a similar manner to the single phase alternator of FIG. 2, in that, as the individual conductors 42–49 are moved past the energy coils and the reflux coils in sequence, energy is generated in the energy coils and transferred to the supply line and the conductors are then re-energized by alternating current produced by the reflux coils and tank circuits. Because a constant rotating field is created in a polyphase machine, such as shown in FIG. 3, the polyphase machine will function both as a generator and as a motor. When the usage of the machine is determined to be as a generator, the value of the AC capacitances are so adjusted as to instantaneously produce a reflux field strength of sufficient intensity to allow the machine to provide the necessary magnetizing current for the connected load. However, when usage is determined to be as a motor, the AC capacitive reactances are set to a pre-determined magnitude sufficient only to offset the internal magnetizing requirements of the machine.

It is usually necessary to provide a method for automatically and quickly adjusting the field current of the alternator to meet the excitation needs for varying loads. Variation of the alternator field current to maintain a steady voltage can be accomplished by varying the reflux or excitor voltage. The circuitry is tuned so that energy transfer from the reflux coils to the rotating field poles or windings and then to the energy coils occurs with the highest efficiency when the field poles or windings are rotating in synchronism with the quasi-rotating field which is formed in the gap between the field poles and the armature winding. The efficiency of energy transfer varies with the impedance of the field poles which, in turn, varies inversely with the rotational speed of the field poles or windings.

The present invention requires that the tuned tank circuit be energized during start up in order for the alternator to be self-excited. The tank circuit becomes activated when an initial charge is placed on the AC capacitance from some suitable external or internal power source. This can be accomplished in a number of ways, such as: from a small permanent magnet imbedded in the rotor, or by a small battery (1.5 volts) connected through an inverter to the primary of a step-up transformer, the secondary of which is connected, through suitable switches, to the capacitance.

While the invention has been described with reference to specifically illustrated preferred embodiments, it should be understood that various changes may be made without departing from the disclosed inventive subject matter particularly pointed out and claimed here below.

I claim:

1. A single phase, self-excited, asynchronous alternator which includes a cylindrical rotor having a plurality of field poles spaced about its periphery, a toroid-shaped armature, said rotor being mounted for rotation within the armature, an energy coil mounted on said armature in close proximity to the rotor, and AC generating means mounted on said armature to energize said field poles with alternating current which corresponds in frequency with the speed of rotation of the rotor, said AC generating means being electrically and inductively isolated from the energy coil and paramutually inductively coupled therewith.

2. A single phase, self-excited, asynchronous alternator as defined in claim 1 wherein said AC generating means includes a reflux coil positioned in close proximity to the rotor and at 90 electrical degrees to the energy coil.

3. A single phase, self-excited, asynchronous alternator as defined in claim 2 wherein the AC generating means includes an AC capacitance connected in series with the reflux coil to form a tank circuit which is tuned to minimize the inductive reactance of the alternator.

4. A single phase, self-excited, asynchronous alternator as defined in claim 3 which includes means inductively connected to the AC generating means for initially energizing the field poles.

5. An asynchronous alternator/motor which includes a rotor having a plurality of conductors spaced about a circumference, an armature, said rotor being mounted for rotation relative to said armature, a winding mounted on said armature in close proximity to said conductors, said winding including an energy coil and a reflux coil which are electrically and inductively isolated from each other and paramutually inductively coupled through the rotor, said reflux coil being positioned at 90 electrical degrees to the energy coil and tuned to minimize the inductive reactance of the alternator/motor.

6. An asynchronous alternator/motor as defined in claim 5 wherein an AC capacitance is connected in series with the reflux coil to form a tuned tank circuit.

7. An asynchronous alternator/motor which includes a cylindrical rotor having a plurality of conductors spaced about its periphery, a toroid-shaped armature, said rotor being mounted for rotation within said armature, a winding mounted on said armature in close proximity to said conductors, said winding including energy coils interspersed with reflux coils to create a rotating magnetomotive force field between the rotor and the armature, the reflux coils being electrically and inductively isolated from the energy coils with each reflux coil positioned at 90 electrical degrees from an energy coil said reflux coils being paramutually inductively coupled with the energy coils through the rotor.

8. An asynchronous alternator/motor as defined in claim 7 in which each reflux coil is connected in series with an AC capacitance to form a tank circuit which is tuned to minimize the inductive reactance of the alternator/motor.

\* \* \* \* \*